Figures 1, 2:
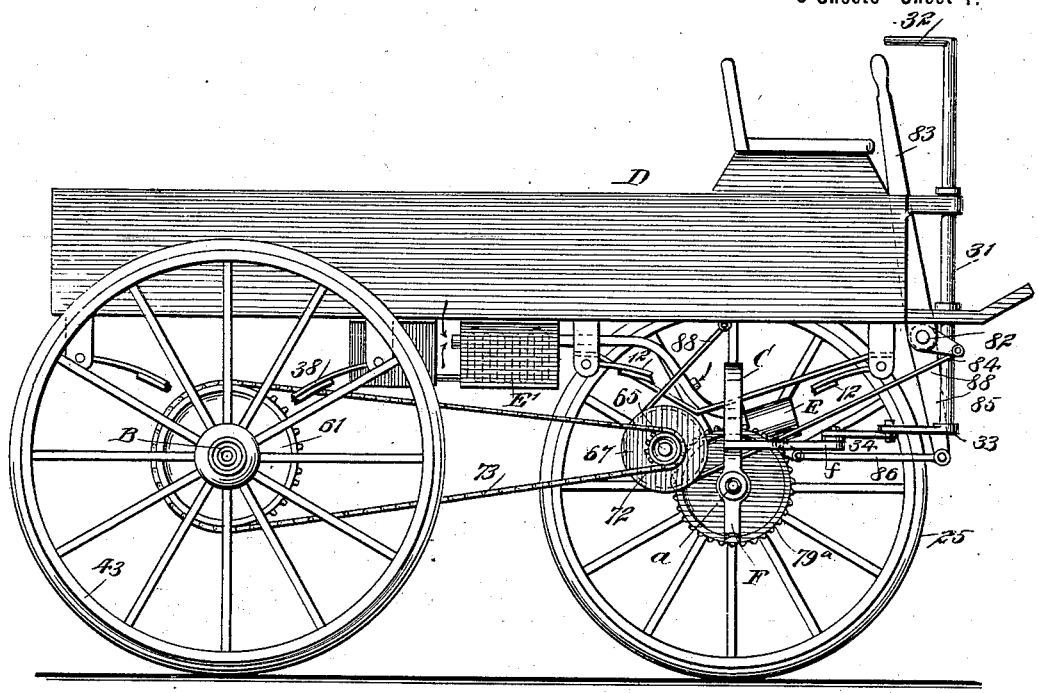

No. 657,381. Patented Sept. 4, 1900.
W. O. BARNES.
AUTOMOBILE.
(Application filed Dec. 1, 1899.)

(No Model.) 3 Sheets—Sheet 1.

WITNESSES:

INVENTOR
William O. Barnes
BY
ATTORNEYS

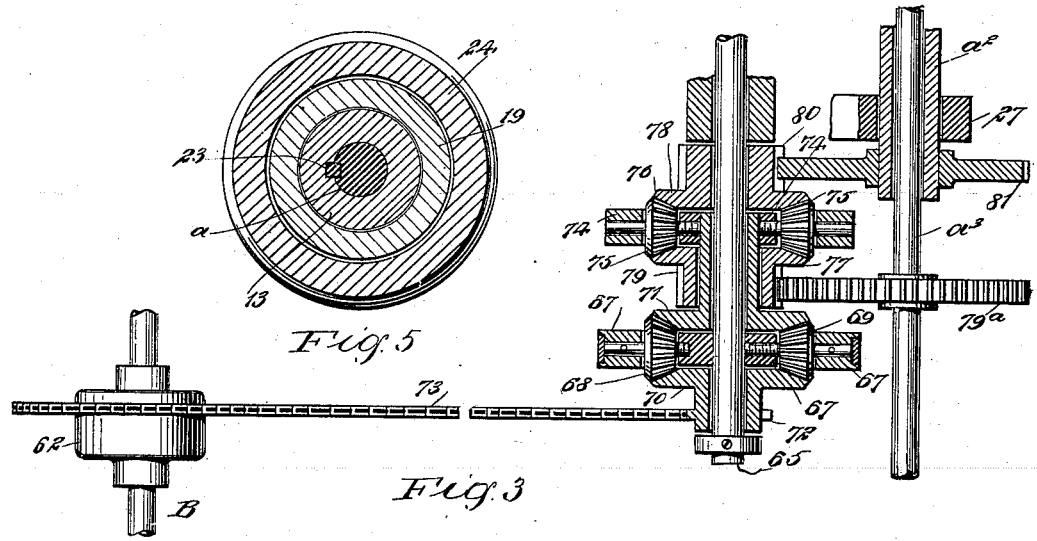
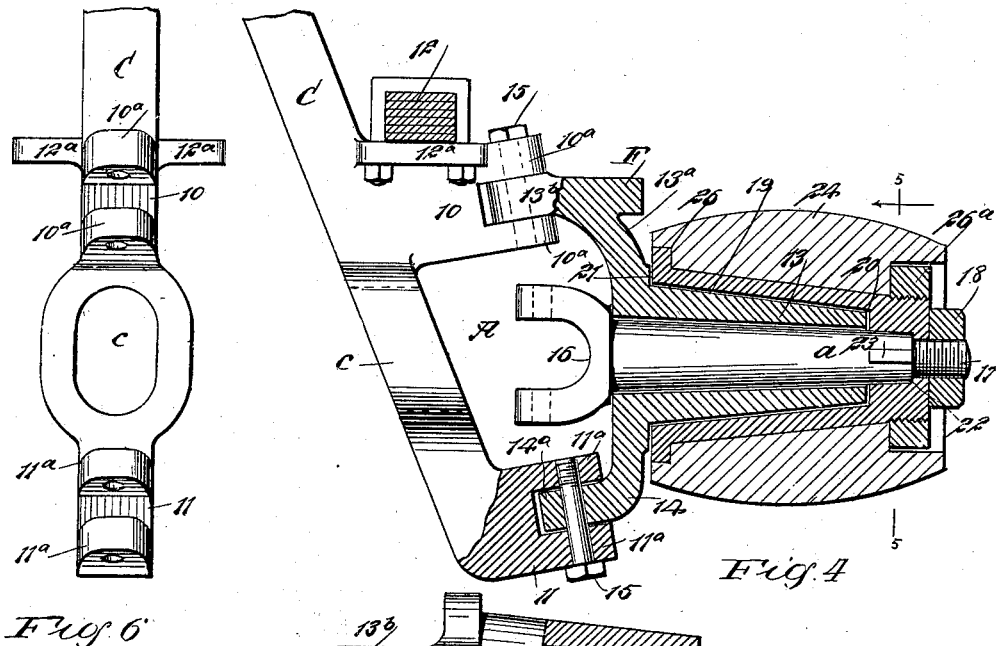
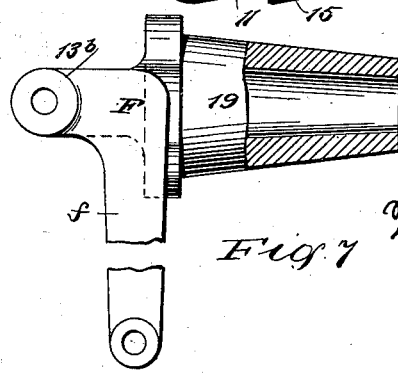

No. 657,381. Patented Sept. 4, 1900.
W. O. BARNES.
AUTOMOBILE.
(Application filed Dec. 1, 1899.)
(No Model.) 3 Sheets—Sheet 3.
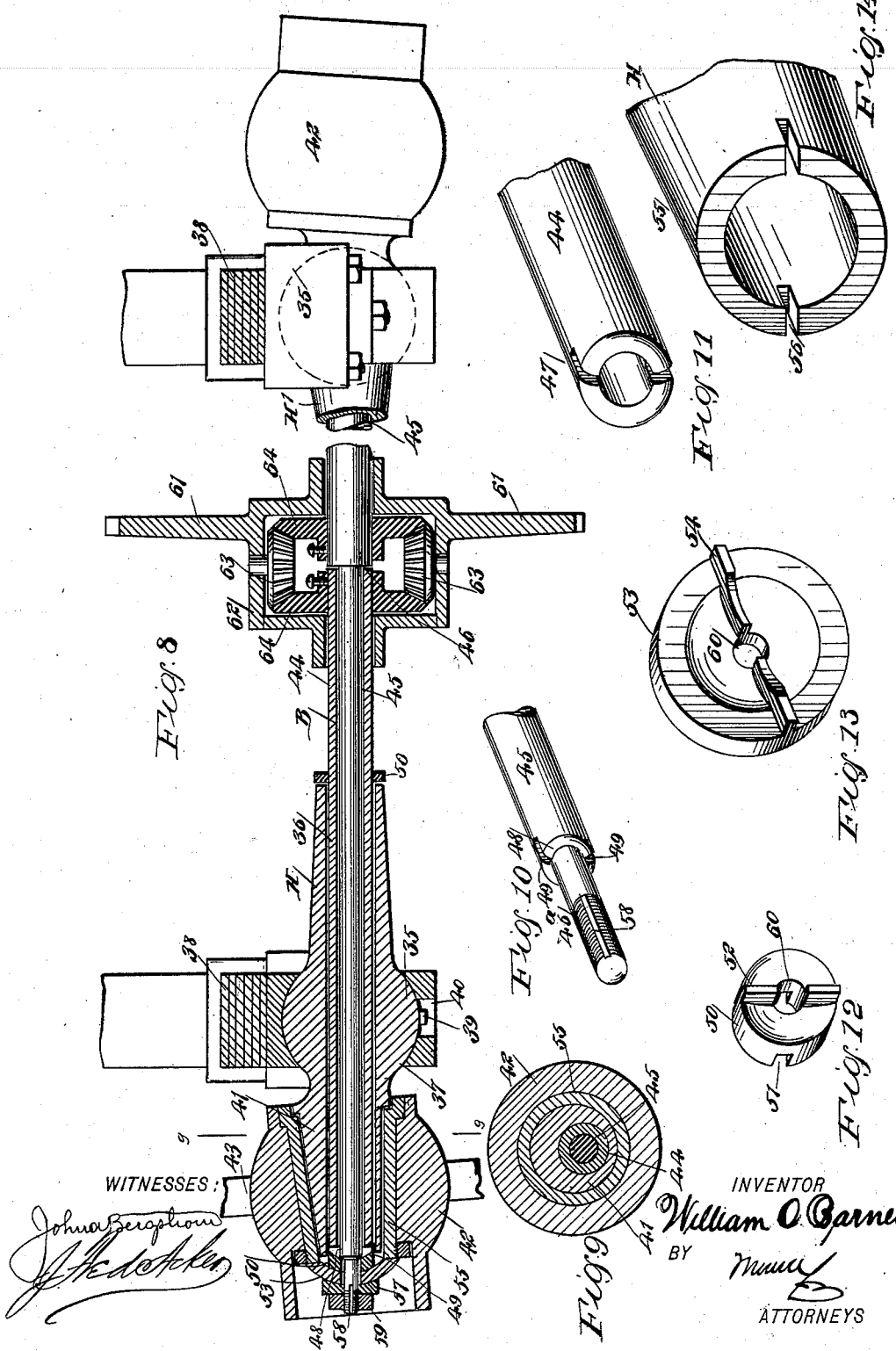
WITNESSES:
INVENTOR
William O. Barnes
BY
ATTORNEYS

UNITED STATES PATENT OFFICE.

WILLIAM O. BARNES, OF STAMFORD, CONNECTICUT.

AUTOMOBILE.

SPECIFICATION forming part of Letters Patent No. 657,381, dated September 4, 1900.

Application filed December 1, 1899. Serial No. 738,884. (No model.)

*To all whom it may concern:*

Be it known that I, WILLIAM O. BARNES, a citizen of the United States, residing at Stamford, in the county of Fairfield and State of Connecticut, have invented a new and Improved Automobile, of which the following is a full, clear, and exact description.

One object of the invention is to distribute propelling power from the motor or engine to all four wheels of the vehicle or to the rear wheels or to the two front wheels and to provide means whereby the vehicle may be readily and easily steered when the front wheels are used as driving-wheels.

A further object of the invention is to so construct the running-gear that the driving-wheels, front or rear, may be spread apart from the ground upward.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a vehicle having the improvement applied. Fig. 2 is a front elevation of the same. Fig. 3 is a detail sectional view illustrating means of transmitting power to the various shafts. Fig. 4 is a vertical section through one of the front stub-axles, showing a wheel-hub and driving-shaft. Fig. 5 is a vertical section on the line 5 5 of Fig. 4. Fig. 6 is a front elevation of an end of the front main axle. Fig. 7 is a side elevation of one of the front stub-axles removed. Fig. 8 is a front view, partially in section, of a rear stub-axle and driving-gear. Fig. 9 is a section taken practically on the line 9 9 of Fig. 8. Fig. 10 is a perspective view of the outer end of the solid member of the rear driving-shaft. Fig. 11 is a perspective view of the outer end of the tubular member of the rear driving-shaft. Figs. 12 and 13 are perspective views of the coupling-washers by means of which the rear wheels are driven by their respective shafts, and Fig. 14 is an outer end view of one member of the rear stub-axles.

A represents the forward axle of the automobile, which is a sectional axle, and B represents the rear axle.

C represents a main or supporting axle adapted for attachment to the body D of the vehicle, and E represents a motor of any suitable description attached to the main or supporting axle C; but the motor E is preferably self starting and reversing. The motor illustrated is of the gasolene type and is provided with the usual tank and carbureter E'.

The main or supporting axle C is arch-shaped and is provided at each leg with an offset 10 near the bottom and a bottom offset 11, both offsets having an outward direction. The offsets 10 are provided with two knuckles $10^a$, spaced a suitable distance apart, and the lower offsets 11 are provided with knuckles $11^a$, also suitably spaced, as illustrated in Fig. 3. The main or supporting axle C is connected with the body D of the vehicle by means of springs 12, and these springs, which may be of any desired character, are secured to the said main axle above the offsets 10, suitable extensions $12^a$ being provided to receive the clips utilized in securing the said springs, as is also shown in Fig. 3. The main or supporting axle C is adapted to carry at each of its side members a stub-axle F, which axle consists of a tubular body 13, said body being exteriorly tapering, its smallest diameter being at its outer end, and an upwardly-extending arm $13^a$ is made integral with the inner end of the said body 13, while a downwardly-extending arm 14 is made integral with the same portion of the body, the two arms $13^a$ and 14 being practically in the same vertical plane. The upper arm $13^a$ of the stub-axle F is provided with a knuckle $13^b$, which is introduced between the knuckles $10^a$ of the upper offset 10 from the main or supporting axle, as is illustrated in Fig. 4. The arm 14 is provided at its lower end with a knuckle $14^a$, which enters the space between the knuckles $11^a$ of the offset 11, formed at the lower end of the main or supporting axle, as is also shown in Fig. 4, and the knuckles $10^a$ and $13^b$ and the knuckles $11^a$ and $14^a$ are pivotally connected through the medium of suitable pins 15, as is also shown in Fig. 4. It may here be remarked that the downwardly-extending members of the main or supporting axle C between the upper and lower knuckles formed thereon are provided with openings $c$, adapted to admit of the passage of a portion of the front axle A. The connection between the stub-axles F and the main or supporting axle C is made in the same manner at each side of the main axle.

As heretofore stated, the front driving-axle A is constructed in sections. The outer or end sections $a$ of the said front driving-axle A are mounted to turn in the stub-axles F, and these outer sections $a$ of the front driving-axle are preferably made tapering, being smallest at their outer ends, and the bores of the body portions of the stub-axles are correspondingly tapered. Under this construction it will be observed that the outer end sections $a$ of the front driving-axle A are given a downward inclination. At the inner end of each outer section $a$ of the front driving-axle A a fork 16 is provided, extending within the space between the upper and lower knuckles of the main or supporting axle, as shown in Fig. 4, and the extreme outer end 17 of each outer section $a$ of the front axle A is reduced and threaded to receive a lock-nut 18. A bushing or skein 19 is mounted to turn upon the outer surface of the body of each stub-axle F, and each bushing or skein is provided with an interior shoulder 20, against which the outer ends of the body portions of the stub-axles abut, and each axle-skein or bushing 19 is further provided with an outer shoulder 22, against which the shoulder formed on the front axle-section $a$ abuts when the skein is placed in position thereon, as is also shown in Fig. 4, and the inner end of each axle-skein or bushing 19 is made to engage with or be in close proximity to a shoulder 21, formed on the stub-axles F, where the body 13 of the said axles connects with the arms $13^a$ and 14, as is also shown in Fig. 4.

Each axle-skein or bushing 19 is attached to an outer section $a$ of the driving front axle A by producing upon one part a feather 23, adapted to enter a corresponding groove produced in the other part, as is indicated in Figs. 4 and 5. The hubs 24 of the front wheels 25 are secured in any suitable or approved manner to the bushings or skeins 19; but these hubs are preferably held in position on the skeins 19 by forming exterior annular flanges 26 at the inner ends of the bushings or skeins and placing nuts $26^a$ on the outer ends of the bushings, which enter suitable recesses produced in the hubs. It will be observed that the wheels 25 stand at less than a right angle to the ground, having an upward and outward inclination, as shown in Fig. 2.

With reference to the construction of the forward driving-axle A, as stated, this axle is made in sections, and the sections comprise the outer sections $a$, above referred to, a central tubular section $a^2$, a solid section $a^3$, which enters the tubular section $a^2$, and intermediate sections $a'$, which connect the end sections $a$. The intermediate sections $a'$, through the medium of the forks 16, have a universal connection with the said end sections $a$, and at the right-hand end of the tubular section $a^2$ a fork 28 is produced, whereby a universal connection is made with the left-hand intermediate section $a'$, while a fork 29 is formed at the right-hand end of the central solid section $a^3$ of the axle A, enabling this section to have a universal connection with the right-hand intermediate section $a'$, as is clearly shown in Fig. 1. The central or tubular section $a^2$ is preferably mounted to turn in bearings 27, extending from the frame supporting the motor E. A connecting-bar 30 is pivoted to forwardly-extending arms $f$, which form a portion of the upper members of the arms $13^a$ of the stub-axles F. The office of this connecting-bar 30 is to keep the two front wheels in their proper relation during the operation of steering and to cause them to act together during such operation.

The steering is effected through the medium of a vertical shaft 31, located usually near the left-hand side of the vehicle at the front, the said shaft being provided with a suitable handle 32 at its upper end. A crank-arm 33 is secured to the lower end of the steering-shaft 31, and this crank-arm is pivotally connected with one end of a bar 34, which bar at its opposite end is pivotally connected to the bar 30, connecting the stub-axles at or near the right-hand side of the latter, as shown in Figs. 1 and 2. The line of the hinge connection between the stub-axles and the main or supporting axle A should be inclined, so as to intersect the ground in or near the plane of the wheels in order to prevent unevenness or obstructions in the road causing undesirable shock to the steering-gear, and in order that the vehicle may have a tendency to run straight I prefer to have the inclined line of the said connection intersect the ground a short distance inward from the vertical plane of the wheel. It will be seen that as the stub-axles are connected together by the rod 30 the weight of the wagon will have a tendency, depending for amount upon the inclination of the hinged axis between the stub and main axles, to keep the wheels straight, since turning the wheels to either side will cause the main or supporting axle A and the body D of the vehicle to be raised farther from the ground.

I am aware that steering stub-axles have been provided with inclined hinges, so that the hinge-axes intersect the ground in the plane of the wheel; but I am not aware that a tubular stub-axle adapted to carry a drive-shaft has been provided with such an inclined hinge; nor am I aware that it has ever been proposed to provide a stub-axle with a hinge of such inclination that the weight of the wagon will create a tendency to run straight.

In Fig. 8 I have illustrated the rear axle B, which axle is constructed in sections, and in the construction of the said axle two tubular stub-axles H and H' are employed, which correspond to the front stub-axles F. These rear stub-axles H and H' are provided with spherical enlargements 35, preferably concentric with the bores 36 of the same, and said rear stub-axles are supported in spherical sockets 37, which are securely bolted or fastened to the rear springs 38. In this manner the rear axle B is connected with the body of the vehicle. This construction is adapted to secure self-alinement of the stub-axles when the sections of the rear driving-shaft, to be hereinafter described, are passed through them. The motion of the stub-axles in their sockets is limited by small teat-like projections 39, extending from the sockets 37 into openings 40 in the lower ends of the sockets, as shown in Fig. 8. The outer ends of the stub-axles are formed into conical or tapering journals 41 to receive the hubs 42 of the rear wheels 43, so that the rear wheels will have the same inclination relative to the ground as the forward wheels. The axes of the wheel-journals are inclined to the axes of the bores of the journals, and hence to the sections of the rear driving-shaft received by them, as will be hereinafter described, so as to allow the two rear wheels to spread apart from the ground upward.

With reference to the construction of the rear axle B a hollow shaft 44 is journaled in the stub-axle H and a shaft 45 is journaled in the hollow shaft 44 and likewise in the rear stub-axle H'. The shaft 44 is shouldered against the inner end of the stub-axle H. The shaft 45 is provided with a shoulder 46, bearing against the inner end of the shaft 44, and is also shouldered against the inner end of the stub-axle H' in the same manner as the shaft 44 is shouldered against the stub-axle H. Both ends of the shaft 45 are threaded, as shown at $46^a$, with reference to one end of said shaft, in Fig. 10. The outer end of the tubular shaft 44 is provided with a slot 47, as shown in Fig. 11, and the shaft 45 is furnished near that end which passes through the stub-axle H' with a shoulder 48, having opposing slots 49 produced therein, as shown in Fig. 10.

In connection with the ends of the shaft 44 and 45 and the rear stub-axles concavo-convexed washers 50 are employed, having slots 51 in their convexed sides and being provided with lugs 52 on their concaved sides. These washers are passed over the ends of the shaft 45 and rest against the slotted ends of the tubular shaft 44 and the shoulder 48 of the shaft 45, the lugs 52 on said washers engaging with and meshing into the slots 47 and 49 in the said shafts. Concavo-convexed washers 53 (shown in Fig. 13) are employed in connection with the washers 50, and the washers 53 are provided with lugs 54 on their concaved sides. These washers 53 are passed over the ends of the shaft 45 and rest on skeins 55, provided for the hubs of the rear wheels, the said skeins being mounted on the stub-axles H and H'. The convexed sides of the washers 50 receive the lugs 54 of the washers 53, which mesh into the slots 51 and into slots 56 in the ends of the axle-skeins 55. Smaller concaved washers 57 are provided, each having a feather or key adapted to fit into keyways 58, cut into the ends of the shaft 45 and rest against the outer sides of the washers 53, and nuts 59 are screwed onto the ends of the shaft 45, thereby holding the several parts in their proper relative position. The holes 60 in the washers 50 and 53 are somewhat larger than the ends of the shaft 45, which pass through them, and it will be seen that they form universal couplings between the sectional driving-shaft B and the hubs of the rear wheels. The washers 50 may be dispensed with and the lugs 54 on the washers 53 be so arranged as to engage directly with the shaft end or shoulder, and other modifications of the coupling may be employed without departing from the spirit of the invention; but the form here shown is the preferred form. The rear stub-axles here shown may be made in one piece, if desired, or they may be rigidly connected together.

A sprocket-wheel 61 is loosely mounted on the rear shafts 44 and 45 of the rear axle B and is provided with a box or a casing 62, inclosing and carrying two or more bevel-pinions 63, meshing into bevel-gears 64, keyed or otherwise secured, one to the shaft 44 and the other to the shaft 45, as is shown in Fig. 8. This combination of gears forms a set of compensating gears distributing the power-supply to the sprocket-wheel 61 and the shafts 44 and 45.

A driving-shaft 65 is mounted between the front and rear axles A and B, and, as shown in Fig. 3, a disk 67 is keyed to the drive-shaft, which disk carries two bevel-pinions 68 and 69, which pinions mesh into and distribute power to bevel-gears 70 and 71. These bevel-gears 70 and 71 are loosely mounted on the shaft 65. The gear 70 is provided with a sprocket-pinion 72 and furnishes power to the rear driving-shaft by means of a chain belt 73 and the compensating gearing inclosed in the casing of the sprocket-wheel 61 on the rear axle. The gear 71 has a disk 74 secured thereto, and the said disk carries two bevel-pinions 75 and 76, which mesh into and distribute power to bevel-gears 77 and 78. The gear 77 is journaled on the hub of the gear 71 and is provided with a pinion 79, meshing into a gear $79^a$, attached to the section $a^3$ of the front driving-axle A. The gear 78 is journaled on the shaft 65 and is provided with a pinion 80, meshing into a gear 81, attached to the section $a^2$ of the front driving-axle A. Thus it will be seen that I provide a prime compensating gearing to distribute the power to two secondary compensating gearings, which in turn distribute the power to the wheels of the vehicle with which they are respectively connected, and it is obvious that by altering the diameter of the wheels or the proportions of the transmitting-gears the power can be distributed to the front and rear wheels in any desired ratio.

Varying with the character of the vehicle and the use for which it is designed, I sometimes prefer to use all four wheels as driving-wheels, as is herein shown. Again, I may prefer to use only the front wheels as driving-wheels, and still again it may be preferable to use only the rear wheels as drivers. In order to use only the front wheels as driving-wheels, the disk 74 is made fast to the shaft 65, and the rear wheels and axles here shown may be replaced by those of any usual construction, and the compensating gears on the disk 67 being no longer needed may be dispensed with, a suitable bearing of course being provided for the gear 77. In order to use only the rear wheels as driving-wheels, the sprocket-pinion carried by the gear 67 is made fast to the shaft 65, and the rest of the gearing shown on the shaft 65 may be dispensed with. The front driving-shafts may also be removed, suitable provision being made to retain the front wheels on the stub-axles.

A suitable crank-shaft 82 is journaled in bearings attached to the body D of the vehicle, and the said crank-shaft is provided with a hand-lever 83 and crank-arms 84 and 85. The crank-arm 85 is connected by a bar 86 with a controlling device for the motor E, the attachment being usually made to the controlling-valve of the motor. The crank-arm 84 is attached to a brake-strap 88, which strap encircles the disk 67, the other end of the strap being secured to the body of the vehicle. The disposition of the parts just mentioned is such that as the hand-lever 83 is operated in a manner to apply the brake the power is shut off at the motor, and vice versa.

Having thus described my invention, I claim as new and desire to secure by Letters Patent—

1. In a horseless vehicle, a steering-wheel, a tubular stub-axle, an arch-shaped main axle or frame having offsets pivotally connected with the stub-axle the axis of the pivotal connection being inclined, and a driving-shaft extending through an opening in the main axle or frame and connected with the wheel.

2. In a horseless vehicle, a steering-wheel, a tubular stub-axle having arms at its inner end, and an arch-shaped main axle or frame provided with offsets pivotally connected with the arms of the stub-axle, the axis of the pivotal connection being inclined, and a driving-shaft passed through the stub-axle and connected with the wheel.

3. In a horseless vehicle, the combination of a tubular stub-axle, having an upwardly-extending arm and a downwardly-extending arm at its inner end, the said arms being formed with knuckles, an arch-shaped main axle or frame, provided at each leg with upper and lower offsets having knuckles pivotally connected with the knuckles of the arms of the stub-axle, the pivotal connection being inclined, a supporting-wheel mounted on the said stub-axle, and a sectional driving-shaft passed through the said stub-axle and secured at one end to the said wheel, the sections of the driving-shaft having universal connections, as described.

4. In a horseless vehicle, the combination of a tubular stub-axle having arms at its inner end, an arch-shaped main axle or frame formed at each leg with offsets, pivotally connected with the arms of the stub-axle, the pivotal joint being inclined, a steering and driving wheel mounted on the said stub-axle, and a sectional knuckled driving-shaft extending through an opening in the main axle or frame and connected at one end with said wheel.

5. In a horseless vehicle, the combination of a tubular axle, a bushing or skein mounted to turn upon the outer surface of the body of the tubular axle, the bushing or skein being provided with an interior shoulder against which the outer end of the tubular axle abuts, the said bushing being further provided with an outer shoulder, a driving-wheel secured to said bushing or skein, a driving-axle passed through the tubular axle, and a keyway and feather connection between the axle skein or bushing and the driving-axle, the outer end of the said driving-axle adjacent to said connection being reduced forming a shoulder adapted to abut against the outer shoulder on the bushing, the said reduced end of the axle being formed with a threaded surface, for the purpose set forth.

6. In a horseless vehicle, the combination of a hollow stub-axle provided with an extending arm, an arch-shaped frame or main axle having offsets attached to the stub-axle by an inclined pivotal joint, and directing mechanism comprising a bar connected with the extended arm of the stub-axle, a vertical shaft provided with a crank-arm, and a connection between the crank-arm and the bar connected with the extended arm of the stub-axle, a wheel mounted upon the stub-axle, and a driving-shaft passed through the said stub-axle, and connected at one end with the wheel.

7. In a horseless vehicle, the combination of two tubular stub-axles, a frame or main axle connected with the stub-axles by inclined pivotal joints, supporting-wheels secured upon the stub-axles, independent three-part driving-shafts passed through said stub-axles and each comprising an end section, an intermediate section, and a central section, one of said central sections being tubular and the other solid and adapted to enter the said tubular section, a connection between the shafts and the wheels, bearings for the central sections of the driving-shafts adapted for attachment to the body of the vehicle or the motor-frame for the same and a connecting-bar located in front of the frame or main axle and pivotally connected at its ends with arms on the stub-axle.

8. In a horseless vehicle, the combination of two tubular stub-axles, each provided with an upwardly-extending arm and a downwardly-extending arm, a frame or main axle provided with offsets connected with the said arms of the stub-axles by inclined pivotal joints, supporting-wheels on the stub-axles, a driving-axle extending through said stub-axles, a connection between the driving-axle and the wheels, a forwardly-extending arm forming part of the upwardly-extending arm of each stub-axle, and a connecting-bar pivoted to said forwardly-extending arms for the purpose set forth.

9. In a horseless vehicle, the combination of two tubular stub-axles each having arms at its inner end, an arch-shaped main axle or frame provided with offsets pivotally connected with the arms of the stub-axle, wheels mounted upon the stub-axles, a driving-shaft passed through the stub-axles and connected with the wheels, a forwardly-projecting arm on each stub-axle and a bar connecting the said arms, for the purpose set forth.

10. In a horseless vehicle the combination of a tubular axle having arms at its inner end, an arch-shaped frame or main axle having an upper and a lower offset to which said arms are pivotally connected, and a vehicle-spring connecting the main or supporting axle with the body of the vehicle, the said spring being secured to the main axle above the upper offset.

11. In a horseless vehicle, the combination of an arch-shaped main or supporting axle provided at each leg with upper and lower offsets having an outward direction, the said offsets being each provided with two knuckles spaced apart, springs secured to the main axle above the upper offset and connecting the axle with the body of the vehicle, a stub-axle having a downward and outward inclination and carried at each of the side members of the main axle, each of said stub-axles being provided at its inner end with an upwardly-extending arm and a downwardly-extending arm, the said arms having knuckles pivotally connected with the knuckles of the offsets of the main axle, a wheel carried by each of said stub-axles, sections of a knuckled shaft extending through openings in the downwardly-extending members of the main or supporting axle between the upper and lower knuckles thereof and received within the stub-axles, and a connection between the shafts and the wheels.

12. In a horseless vehicle, a rear axle consisting of two shaft-sections mounted one within the other, a stub-axle receiving the shaft-sections and having an inclined spindle and an enlarged portion near the spindle, means for supporting the stub-axle and preventing the same from turning, a skein mounted upon the spindle of the stub-axle, and couplings connecting the outer ends of the shaft-sections and the axle-skein.

13. In a horseless vehicle, a rear axle consisting of two shaft-sections mounted one within the other, the inner section extending beyond the inner end of the outer section, a stub-axle located upon the outer end of the projecting portion of the inner shaft-section of the axle, means for spring-supporting the stub-axle and holding it against turning, an axle-skein mounted upon the stub-axle, and couplings between the projecting portion of the inner shaft-section of the axle and the axle-skein.

14. In a horseless vehicle, the combination of the front and rear axles, a driving-shaft mounted between the same, a disk keyed to the driving-shaft and carrying two pinions, gear-wheels loosely mounted on the driving-shaft and engaged by the said pinions, a train of gearing between one of said loosely-mounted gear-wheels and the rear axle for distributing power to the same, a second disk secured to the other gear-wheel, two pinions carried by said second disk, and gears to which the power is transmitted from the said pinions the said gears being provided with pinions meshing respectively with gears attached to the members of the front axle, substantially as described.

15. In a horseless vehicle, the combination with the front axle formed of two independent members, and a driving-shaft arranged parallel with the same, of a disk on said driving-shaft, two pinions carried by said disk, and gears mounted to turn loosely on the driving-shaft and to which the power is transmitted from the said pinions, one of said gears being provided with a pinion meshing with a gear attached to one of the members of the front axle, the other gear being provided with a pinion meshing with a gear attached to the other member of the front axle, substantially as described.

16. In a horseless vehicle, the combination with the rear axle consisting of two shaft-sections, mounted one within the other, and a driving-shaft extending parallel with the rear axle, of a wheel loosely mounted on the rear axle and driven from the driving-shaft, a box or casing fixed to the said wheel and turning therewith, pinions carried by the box or casing on the inner side thereof and gear-wheels secured to the shaft-sections of the rear axle and with which the said pinions mesh respectively, substantially as described.

17. In a horseless vehicle the combination with the rear axle consisting of two shaft-sections mounted one within the other and a driving-shaft extending parallel with the rear axle, of a sprocket-pinion carried by said driving-shaft, a sprocket-wheel loosely mounted on the rear axle, and connected by a chain belt with the said sprocket-pinion, the said sprocket-wheel being provided with a box or casing arranged to turn therewith, pinions inclosed and carried by the box or casing, and gears secured to the shaft-sections of the rear axle and with which the said pinions mesh respectively, substantially as described.

18. In a horseless vehicle, the combination of a tubular stub-axle, an axle journaled in the same, the said stub-axle being provided with a spherical enlargement, a spherical socket receiving said spherical enlargement, and a vehicle-spring to which the said socket is secured, substantially as described.

19. In a horseless vehicle the combination of the rear axle, the tubular stub-axles provided with spherical enlargements concentric with the bores of the same, spherical sockets adapted to receive the said enlargements, springs connected with the body of the vehicle and secured to the said sockets, and means for limiting the motion of the stub-axles in their sockets, substantially as described.

20. In a horseless vehicle, a steering-wheel, a driving-axle constructed in sections and connected therewith, a tubular stub-axle, having arms at its inner end, and an arch-shaped main axle or frame pivotally connected with the arms of the stub-axle, the axis of the pivotal connection being inclined, the outer or end section of the driving-axle being mounted to turn in the stub-axle, and having a downward inclination, substantially as described.

21. In a horseless vehicle, the combination of two tubular stub-axles, an arch-shaped main frame or axle pivotally connected at its legs with the stub-axles, the axis of the pivotal connection being inclined, wheels mounted upon the stub-axles, a driving-axle made in sections, the outer or end sections of the axle being mounted to turn in the stub-axles and having a downward inclination, and a bar connecting the stub-axles, for the purpose set forth.

In testimony whereof I have signed my name to this specification in the presence of two subscribing witnesses.

WILLIAM O. BARNES.

Witnesses:
J. FRED. ACKER,
AUGUST I. TEYETMEIEN.